United States Patent [19]

Haga et al.

[11] 4,287,977
[45] Sep. 8, 1981

[54] HYDRAULIC CLUTCH RELEASE MECHANISM

[75] Inventors: Shozi Haga; Hisao Ootani, both of Toyota, Japan

[73] Assignee: Toyota Jidosha Kogyo Kabushiki Kaisha, Toyota, Japan

[21] Appl. No.: 45,054

[22] Filed: Jun. 4, 1979

[30] Foreign Application Priority Data

Oct. 28, 1978 [JP] Japan ................................ 53-132989
Oct. 28, 1978 [JP] Japan ................................ 53-132990

[51] Int. Cl.³ ............................................. F16D 25/08
[52] U.S. Cl. ................................................ 192/91 A
[58] Field of Search .................. 192/91 R, 101, 85 C, 192/91 A, 85 CA

[56] References Cited

U.S. PATENT DOCUMENTS 3,786,903 1/1974 Haga ............................. 192/91 R
4,044,871 8/1977 Kiener ........................... 192/91 A

FOREIGN PATENT DOCUMENTS 187800 11/1956 Austria.
1037882 8/1958 Fed. Rep. of Germany.
1530780 6/1970 Fed. Rep. of Germany.

Primary Examiner—Andrew V. Kundrat
Attorney, Agent, or Firm—Armstrong, Nikaido, Marmelstein & Kubovcik

[57] ABSTRACT

In an hydraulic release mechanism for a vehicle clutch, a seal member is adapted to a transmission housing assembly to surround an extended portion of a push-rod in a fluid tight manner, and an hydraulic cylinder includes a cylinder housing provided at its closed end with a port for connection to a source of hydraulic pressure and being detachably secured to the housing assembly at its open end to contain one end of the push-rod therein, and a piston axially slidable within the cylinder housing through an annular seal member to subdivide the interior of the cylinder housing into a pneumatic chamber in open communication with the atmospheric air and an hydraulic chamber in open communication with the port, the piston being engaged with the one end of push-rod to urge the push-rod toward a release member of the vehicle clutch.

6 Claims, 5 Drawing Figures

HYDRAULIC CLUTCH RELEASE MECHANISM

BACKGROUND OF THE INVENTION

The present invention relates to hydraulic release mechanisms for vehicle clutches, and more particularly to an improvement of an hydraulic clutch release mechanism of the type which includes a push-rod axially slidable within an input shaft of a power transmission unit and being engaged at its one end with a release member of a vehicle clutch and an hydraulic cylinder attached to a housing assembly of the transmission unit to urge the push-rod toward the release member causing disengagement of the vehicle clutch.

In conventional clutch release mechanisms of this kind, the property of fluid supplied to the hydraulic cylinder is usually different from that of lubricating oil stored within the transmission housing. If an amount of the hydraulic fluid flows into the transmission housing from the cylinder, it will damage seal members of synthetic rubber which are adapted to the transmission unit.

SUMMARY OF THE INVENTION

It is, therefore, an object of the present invention to provide an improved clutch release mechanism of which an hydraulic cylinder can be removed from a transmission housing in a clean condition without any fluid leakage.

It is another object of the present invention to provide an improved clutch release mechanism which is designed to prevent the entry of dust and/or dirty water into the hydraulic cylinder to maintain smooth movements of a piston in the cylinder.

According to the present invention there is provided an hydraulic release mechanism for a vehicle clutch which comprises a push-rod axially slidable within an input shaft of a power transmission unit and having one end engaged with a release member of the clutch and the other end extended outwardly from a housing assembly of the transmission unit and an hydraulic cylinder attached to the housing assembly to urge the push-rod toward the release member causing disengagement of the vehicle clutch, and wherein a seal member is adapted to the housing assembly to surround the extended portion of the push-rod in a fluid tight manner, and the hydraulic cylinder includes a cylinder housing provided at its closed end with a port for connection to a source of hydraulic pressure and being detachably secured to the housing assembly at its open end to contain the other end of the push-rod therein, and a piston axially slidable within the cylinder housing through an annular seal member to subdivide the interior of the cylinder housing into a pneumatic chamber in open communication with the atmospheric air and an hydraulic chamber in open communication with the port, the piston being engaged with the other end of the push-rod.

Preferably, a communication passage is provided between the open end of the cylinder housing and the outer wall surface of the transmission housing assembly to vent the pneumatic chamber to the atmosphere, the communication passage having the upper end opening to the bottom of the pneumatic chamber and the lower end opening adjacent to an embossed portion of the housing assembly. To provide the communication passage, the cylinder housing may be formed at its open end with a slant groove which extends downwardly in a predetermined length and opens at its upper end to the pneumatic chamber and at its lower end toward the embossed portion of the housing assembly.

BRIEF DESCRIPTION OF THE DRAWINGS

The above and other advantages will be made more apparent from the following specification taken in conjunction with the accompanying drawings, in which.

DESCRIPTION OF THE PREFERRED EMBODIMENTS

Figure 1:
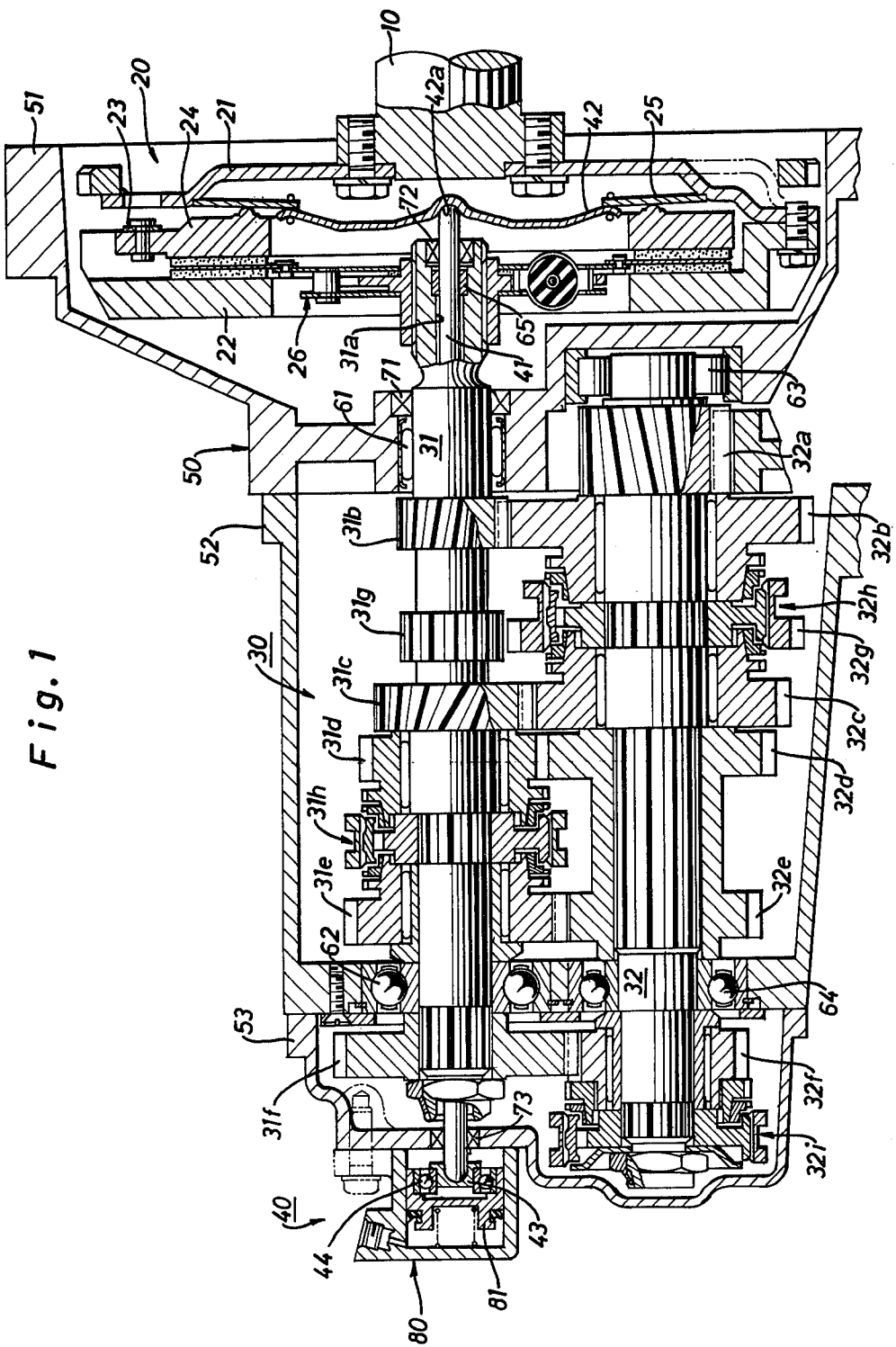
FIG. 1 illustrates an elevational section of an hydraulic release mechanism of the present invention adapted to a power transmission unit.

Referring now to the drawings, FIG. 1 illustrates a conventional friction disc clutch 20 of the diaphragm type which is interposed between a crankshaft 10 of a vehicle engine and an input shaft 31 of a power transmission unit 30. The friction disc clutch 20 is arranged to be released by an hydraulic release mechanism 40 of the present invention. The friction disc clutch 20 is housed within a trans-axle casing 51 and includes a clutch cover 21 firmly secured to the crankshaft 10, a flywheel 22 fixed to the clutch cover 21, and a pressure plate 24 carried on the clutch cover 21 by means of straps 23 to be moved only in an axial direction. The disc clutch 20 further includes an annular diaphragm spring 25 for biasing the pressure plate 24 toward the flywheel 22 and a clutch disc assembly 26 axially slidable on the input shaft 31 to be pressed by the pressure plate 24 against the flywheel 22.

The power transmission unit 30 is provided with an output shaft 32 which is arranged in parallel with the input shaft 31 within a housing assembly 50. The housing assembly 50 includes a transmission casing 52 secured to the trans-axle casing 51 in a fluid tight manner and a case cover 53 secured to the casing 52 in a fluid tight manner. An amount of lubricating oil is stored within the housing assembly 50. The input shaft 31 is rotatably supported by a pair of bearings 61, 62 respectively carried on the trans-axle casing 51 and the transmission casing 52. The right end of input shaft 31 extends into the trans-axle casing 51 through an oil seal member 71 and carries the clutch disc assembly 26 thereon. The input shaft 31 is also provided therein with an axial bore 31a through which a push-rod 41 of the release mechanism 40 is axially slidable and extends outwardly at its opposite ends.

The output shaft 32 is rotatably supported by a pair of bearings 63, 64 respectively carried on the trans-axle casing 51 and the transmission casing 52, which is integrally provided at its right end with a final reduction speed gear 32a. The output shaft 32 is further provided thereon with first, second, third, fourth and fifth speed gears 32b, 32c, 32d, 32e and 32f and includes a synchronizer 32h for first and second speeds and a synchronizer 32i for fifth speed, the synchronizer 32h being provided thereon with a reverse gear 32g. In addition, the input shaft 31 is provided thereon with first, second, third, fourth and fifth speed gears 31b, 31c, 31d, 31e and 31f which are in meshing engagement with the above respective speed gears on output shaft 32. The input shaft 31 is further provided thereon with a reverse drive gear 31g and a synchronizer 31h for third and fourth speeds.

Figure 2:
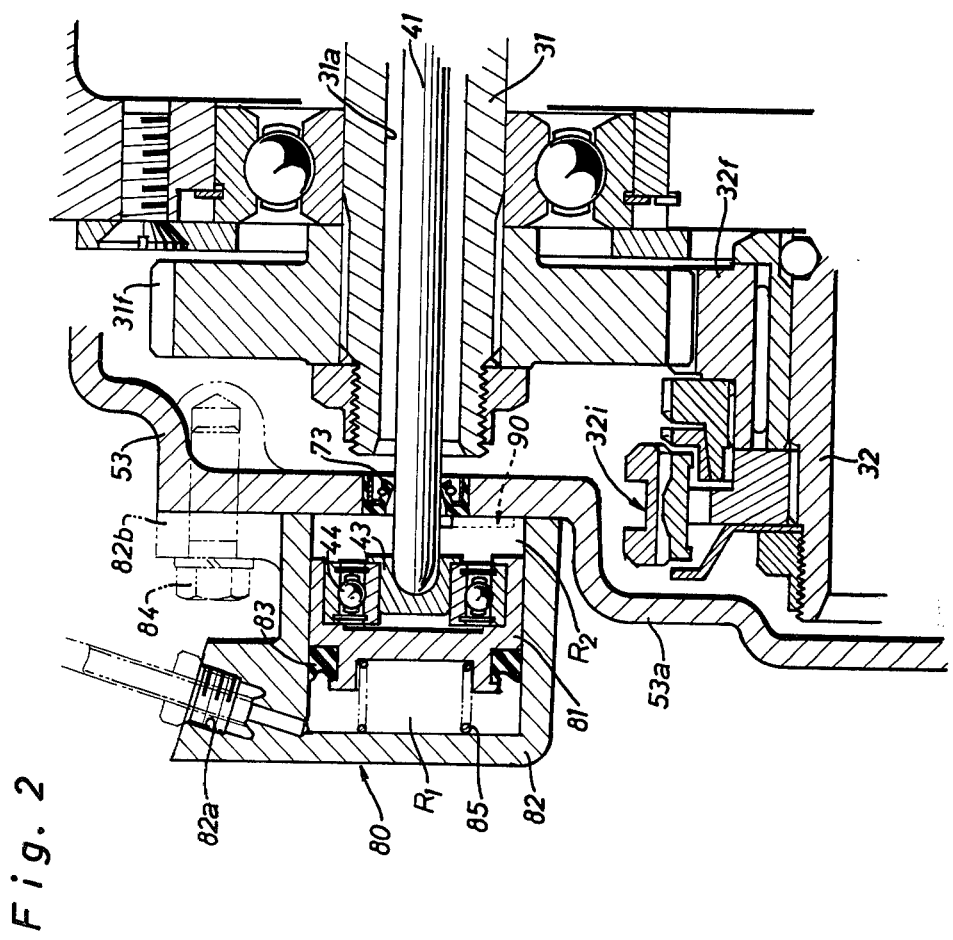
FIG. 2 is an enlarged view showing the release mechanism of FIG. 1.

The hydraulic release mechanism 40 is provided with an hydraulic cylinder 80 which is operatively connected with the left end of push-rod 41. The right end of push-rod 41 is rotatably supported by a bearing metal 65 and extends through a seal member 72, being engaged with a central recess 42a of a release plate 42 to transmit the rightward movement of push-rod to the diaphragm spring 25 of clutch 20. The left end of push-rod 41 is received by a cup-shaped retainer 43 which is rotatably assembled with a piston 81 through a ball bearing 44. As shown in FIG. 2, the left end portion of push-rod 41 is surrounded by a seal member 73 to keep foreign matter out of the case cover 53 and to retain lubricating oil within the housing assembly 50.

Figure 3:
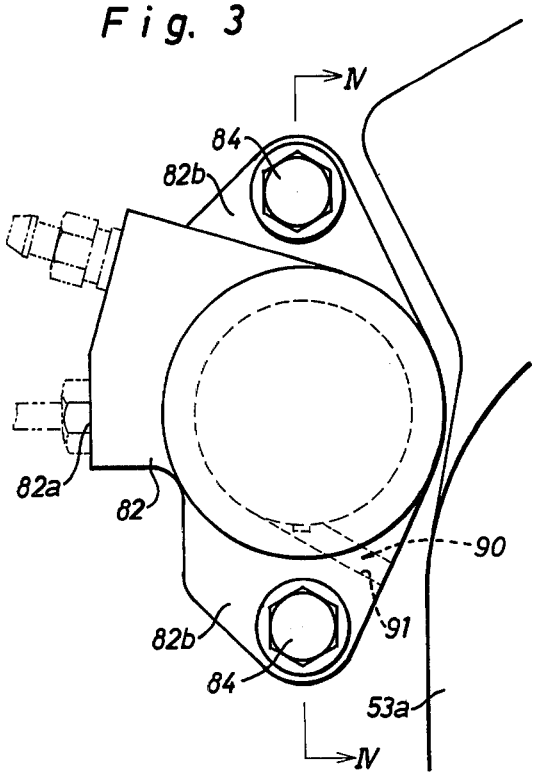
FIG. 3 is a front view of the release mechanism depicted from the left side to FIG. 2.
Figure 4:
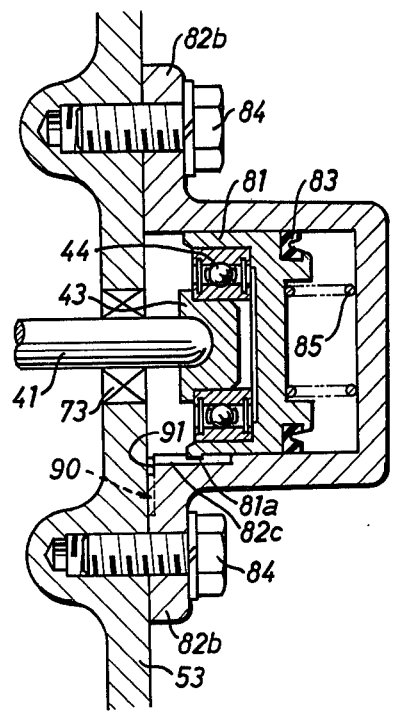
FIG. 4 is a sectional view of the release mechanism taken along the line IV—IV in FIG. 3.

The hydraulic cylinder 80 has a cup-shaped housing 82 in which the piston 81 is axially slidable through an annular seal cup 83 to subdivide the interior of housing 82 into an hydraulic chamber $R_1$ and a pneumatic chamber $R_2$ in a fluid-tight manner. The cylinder housing 82 is provided at its closed end with a port 82a for connection to a source of hydraulic pressure and at its open end with opposite flanges 82b which are detachably secured to the case cover 53 by bolts 84, as shown in FIGS. 3 and 4. Thus, the hydraulic chamber $R_1$ is in open communication with the port 82a, and the pneumatic chamber $R_2$ is communicated with the exterior through a passage 90. In addition, a return spring 85 is engaged at its one end with the inner wall of housing 82 to bias the piston 81 in a rightward direction, and, as shown in FIG. 4, the piston 81 is provided at its bottom with a projection 81a which is slidably engaged within an axial groove 82c to prevent rotation of the piston 81. The groove 82c is formed on the inner wall of the bottom portion of housing 82.

The open end of cylinder housing 82 is provided at its bottom with a slant groove 91 in a U-shaped cross-section which extends downwardly through the flange 82b of housing 82 in a relative long distance. Thus, the communication passage 90 is formed between the slant groove 91 and the outer wall of case cover 53, opening at its upper end into the pneumatic chamber $R_2$. The lower end of passage 90 is located adjacent to an embossed portion 53a of the case cover 53 and opens toward the exterior. The embossed portion 53a is formed to contain the fifth speed gear 32f and the synchronizer 32i therein. When the hydraulic chamber $R_1$ is supplied with hydraulic fluid from the source of hydraulic pressure, the piston 81 moves to urge the push-rod 41 in the rightward direction. Then, the release plate 42 is moved by the push-rod 41 to tilt the diaphragm spring 25 in the rightward direction. This results in release of the pressure plate 24 from the clutch disc 26 to cause disengagement of the friction disc clutch 20.

In the assembly described above, the hydraulic release mechanism 40 is characterized in that the cylinder housing 82 is detachably secured to the case cover 53 by bolts 84, the seal cup 83 serves to seal the hydraulic chamber $R_1$, and the seal member 73 serves to seal the interior of case cover 53. When the bolts 84 are removed from the case cover 53, the cylinder housing 82 can be removed without any fluid leakage from the hydraulic chamber $R_1$ and the housing assembly 50.

This serves to facilitate disassembling works for preservation and inspection of the release mechanism 40 and to make the works cleanly. In use of the hydraulic release mechanism 40, even if the hydraulic chamber $R_1$ leaks hydraulic fluid into the pneumatic chamber $R_2$ due to damage of the seal cup 83, the hydraulic fluid will flow along the bottom wall of cylinder housing 82 and discharge through the communication passage 90. Thus, the hydraulic fluid does not enter the housing assembly 50, and the seal members 71, 72, 73 of synthetic rubber are protected from damage due to the hydraulic fluid to maintain good sealing effects in a long period of time.

In the construction of the hydraulic release mechanism 40, it is also noted that the lower end of passage 90 is located adjacent to the embossed portion 53a of case cover 53 to prevent dust and/or dirty water from entering into the pneumatic chamber $R_2$. Even if the passage 90 allows small amounts of the dust and/or water to enter at its lower portion, the dust and water will not flow into the pneumatic chamber $R_2$ owing to the length and slant of passage 90. This serves to prevent damage of the piston 81 and corrosion of the cylinder housing 82 caused by the entry of dust and water and to maintain smooth sliding movements of the piston 81 within the housing in a long period of time. It is, further, noted that the projection 81a of piston 81 is engaged with the axial groove 82c of housing 82 to restrict relative rotation of the piston, ensuring durability of seal cup 83 and return spring 85.

Figure 5:
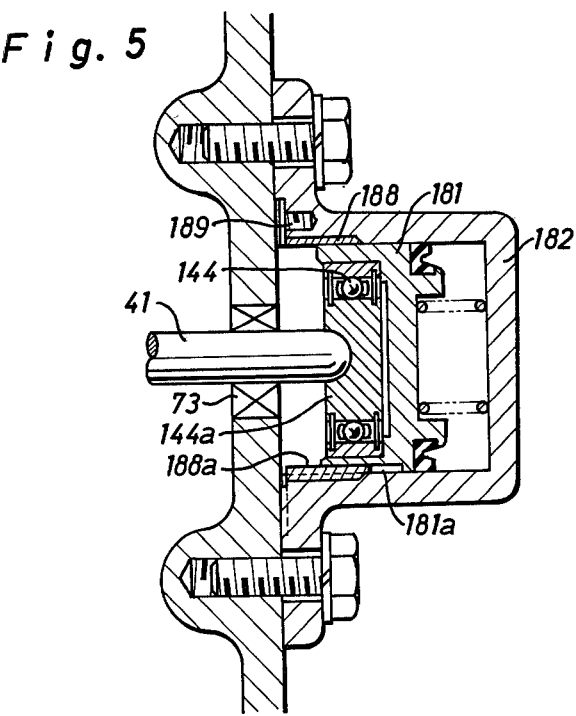
FIG. 5 is a sectional view of another embodiment of the present invention.

In FIG. 5, there is illustrated another embodiment of the hydraulic release mechanism 40 in which a retainer member for the push-rod 41 is integrally formed with an inner race 144a of a ball bearing 144. A piston 181 is provided at its outer periphery with an axial groove 181a, and a stationary sleeve member 188 is provided with an axial projection which is slidably engaged with the axial groove 181a to prevent rotation of the piston 181. The sleeve member is coupled within a cylinder housing 182 and is fixed to the same by a fastening screw 189. Other construction of this embodiment is substantially the same as those of the previous embodiment, and the same advantages are obtainable as in the previous embodiment.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In an hydraulic release mechanism for a vehicle clutch in combination with a power transmission unit, said release mechanism comprising a push-rod axially slidable within an input shaft of said transmission unit and having one end engaged with a release member of said clutch and the other end extended outwardly from said housing assembly of said transmission unit and an hydraulic cylinder attached to said housing assembly to urge said push-rod toward said release member, causing disengagement of said clutch;

the improvement wherein a seal member is adapted to said housing assembly for surrounding the outwardly extended portion of said push-rod in a fluid tight manner, and said hydraulic cylinder includes a cylinder housing provided at its closed end with a port for connection to a source of hydraulic pressure and being detachably secured at its open end to said housing assembly to contain the outwardly extended end of said push-rod therein; a piston axially slidable within said cylinder housing and engaged with the outwardly extended end of said push-rod, said piston being provided at its outer periphery with an annular seal member to subdivide the interior of said cylinder housing into a pneumatic chamber and an hydraulic chamber in open communication with said port; and a communication passage provided between the open end of said cylinder housing and the outer wall surface of said transmission housing assembly to vent said pneumatic chamber to the atmospheric air, said communication passage having the upper end opening into the bottom portion of said pneumatic chamber and the lower end opening adjacent to an embossed portion of said housing assembly.

2. The improvement as claimed in claim 1 wherein said cylinder housing is provided therein with a stationary sleeve member which is formed at its inner surface with an axial projection and located within said pneumatic chamber, and wherein said piston is provided at its outer periphery with an axial groove slidably engaged with said axial projection of said sleeve member.

3. The improvement as claimed in claim 1 wherein a bearing assembly is coupled within said piston, said bearing assembly having an outer race fixed to said piston and an inner race engaged with the outwardly extended end of said push-rod, said inner race being formed as a retainer block member for said push-rod.

4. The improvement as claimed in claim 1, wherein said cylinder housing is formed at its open end-face with a slant groove which extends downwardly in a predetermined length and opens at its upper end into said pneumatic chamber and at its lower end toward the embossed portion of said housing assembly, said communication passage being formed by said slant groove.

5. The improvement as claimed in claim 4, wherein said cylinder housing is provided at its open end with opposite flanges which are detachably secured to the outer wall of said housing assembly and located adjacent to the embossed portion of said housing assembly, said slant groove extending through one of said flanges.

6. The improvement as claimed in claim 1, wherein said cylinder housing is provided at its inner wall with an axial groove, and said piston is provided with a projection which is slidably engaged within said axial groove to prevent relative rotation of said piston.

* * * * *